United States Patent
Aaby et al.

(10) Patent No.: US 10,148,448 B2
(45) Date of Patent: Dec. 4, 2018

(54) CONTROL MESSAGING IN A CABLE NETWORK

(71) Applicant: ARRIS Enterprises, Inc., Suwanee, GA (US)

(72) Inventors: Cliff D. Aaby, Vancouver, WA (US); Ting Ning, Kirkland, WA (US); Russell L. Holm, Renton, WA (US); Carol Ansley, Johns Creek, GA (US)

(73) Assignee: ARRIS Enterprises LLC, Suwanee, GA (US)

( * ) Notice: Subject to any disclaimer, the term of this patent is extended or adjusted under 35 U.S.C. 154(b) by 0 days.

(21) Appl. No.: 14/548,540

(22) Filed: Nov. 20, 2014

(65) Prior Publication Data

US 2015/0146721 A1 May 28, 2015

Related U.S. Application Data (60) Provisional application No. 61/907,426, filed on Nov. 22, 2013.

(51) Int. Cl.
*H04L 12/18* (2006.01)
*H04L 29/06* (2006.01)
(Continued)

(52) U.S. Cl.
CPC ........ *H04L 12/185* (2013.01); *H04L 61/2069* (2013.01); *H04L 65/4076* (2013.01);
(Continued)

(58) Field of Classification Search
CPC ....... H04L 12/185; H04L 45/16; H04L 12/18; H04L 45/02; H04L 63/1458; H04L 12/66;
(Continued)

(56) References Cited

U.S. PATENT DOCUMENTS 7,864,686 B2 * 1/2011 Chapman ............ H04L 12/1859
370/237
8,310,957 B1 * 11/2012 Rekhter .............. H04L 12/4641
370/256
(Continued)

OTHER PUBLICATIONS

Official Action, Re: Canadian Application No. 2,871,749, dated Jan. 8, 2016.
(Continued)

*Primary Examiner* — Natasha W Cosme
(74) *Attorney, Agent, or Firm* — Stewart M. Wiener (57) ABSTRACT

A method for providing data streams to a plurality of customer premises equipment (CPE) devices communicatively coupled to a network is provided. Downstream network plant and CPE correlation information is generated with a digital controller that has access to a database including at least one of CPE control information, subscriber management information, security and access information, provisioning information, billing information, application traffic information, and configuration information. A plurality of data streams is provided as Protocol Independent Multicasts (PIM) streams to the plurality of CPE devices, and each of the CPE devices is provided with Multicast Address information relative to the PIM streams to permit auto-discovery by each of the CPE devices of appropriate PIM streams. An apparatus for preforming the above method is also disclosed.

19 Claims, 5 Drawing Sheets

(51) Int. Cl.
*H04N 21/239* (2011.01)
*H04N 21/61* (2011.01)
*H04N 21/6543* (2011.01)
*H04N 21/6547* (2011.01)
*H04L 29/12* (2006.01)

(52) U.S. Cl.
CPC ......... *H04L 65/602* (2013.01); *H04N 21/239* (2013.01); *H04N 21/6118* (2013.01); *H04N 21/6168* (2013.01); *H04N 21/6543* (2013.01); *H04N 21/6547* (2013.01); *H04L 65/60* (2013.01)

(58) Field of Classification Search
CPC ..... H04L 12/1868; H04L 45/28; H04L 45/58; H04L 29/12783; H04L 61/35; H04L 12/1886; H04L 45/52; H04L 12/4641; H04L 12/4645; H04L 29/12009
USPC .......................................... 370/282, 341, 312
See application file for complete search history.

(56) References Cited

U.S. PATENT DOCUMENTS

| | | | | |
|---|---|---|---|---|
| 2002/0196741 | A1* | 12/2002 | Jaramillo | H04L 51/18 370/252 |
| 2003/0004961 | A1* | 1/2003 | Slothouber | G06F 9/445 |
| 2006/0285544 | A1 | 12/2006 | Taylor et al. | |
| 2007/0067817 | A1* | 3/2007 | Hamilton | H04L 63/08 725/100 |
| 2007/0261089 | A1 | 11/2007 | Aaby et al. | |
| 2007/0274345 | A1 | 11/2007 | Taylor et al. | |
| 2009/0165066 | A1* | 6/2009 | Brouda | H04N 5/4401 725/110 |
| 2011/0085564 | A1 | 4/2011 | Taylor et al. | |
| 2011/0188439 | A1* | 8/2011 | Mao | H04N 7/17318 370/312 |
| 2011/0188499 | A1* | 8/2011 | Wijnands | H04L 12/56 370/390 |
| 2012/0291077 | A1 | 11/2012 | Aaby et al. | |

OTHER PUBLICATIONS

"OpenCable™ Specifications: CableCARD Interface 2.0 Specification OC-SP", Document 0C-SP-CCIF2.0-126-130418, Cable Television Laboratories, Inc., Apr. 2013.

"OpenCable™ Specifications: OpenCable Bundle Requirements", Document 0C-SP-BUNDLE1.3-130418, Cable Television Laboratories, Inc., Apr. 2013.

"Data-Over-Cable Service Interface Specifications: DOCSIS Set-top Gateway (DSG) Interface Specification", Document CM-SP-DSG-124-130808, Cable Television Laboratories, Inc., Aug. 2013.

Official Action, Re: Canadian Application No. 2,871,749, dated Jul. 27, 2016.

European Examination Report, Re: Application No. 14194414, dated Oct. 10, 2016.

Examination Report, Re: European Application No. 14194414.0, dated Mar. 22, 2016.

European Examination Report, Re: Application No. 14194414.0, dated Oct. 10, 2016.

Official Action, Re: Canadian Application No. 2,871,749, dated Jun. 9, 2017.

* cited by examiner

(PRIOR ART)

CONTROL MESSAGING IN A CABLE NETWORK

CROSS REFERENCE TO RELATED APPLICATIONS

This application claims the benefit under 35 USC § 119(e) of U.S. Provisional Patent Application No. 61/907,462, filed Nov. 22, 2013.

BACKGROUND

Multiple System Operators (MSOs) and other service providers operate or provide networks, for example, using Data-Over-Cable Service Interface Specifications (DOCSIS). DOCSIS describes the operation of a data network over a cable network such as a hybrid fiber-coaxial (HFC) cable network.

DOCSIS Set-Top Gateway (DSG) is a specification that allows cable headend equipment, such as a Cable Modem Termination System (CMTS), to provide out-of-band (OOB) messaging in a DOCSIS network. DSG can be used to send OOB messaging over existing cable networks to customer premises equipment (CPE), such as set-top boxes (STBs), media gateways (MGs), and other devices such as cable modems (CMs) that are able to receive signals from a CMTS. Alternatively, the information can be sent over other broadband access network topologies, such as Fiber To The Home (FTTH).

DSG can typically be implemented in pre-existing DOCSIS network infrastructure without requiring significant changes to the DOCSIS network infrastructure. However, the interface and protocol defined by DSG introduce additional requirements on the DOCSIS CMTS and DOCSIS cable modems (CMs), in order to support the configuration and transport of OOB messaging between a headend device and the CPE.

DSG is described, for example, in a specification that has been made publicly available: Cable Television Laboratories, Inc., *Data-Over-Cable Service Interface Specifications: DOCSIS Set-top Gateway (DSG) Interface Specification*, CM-SP-DSG-I24-130808 (August 2013).

BRIEF DESCRIPTION OF THE DRAWINGS

Various features of the embodiments described in the following detailed description can be more fully appreciated when considered with reference to the accompanying figures, wherein the same numbers refer to the same elements.

DETAILED DESCRIPTION

For simplicity and illustrative purposes, the principles of the embodiments are described by referring mainly to examples thereof. In the following description, numerous specific details are set forth in order to provide a thorough understanding of the embodiments. It will be apparent however, to one of ordinary skill in the art, that the embodiments may be practiced without limitation to these specific details. In some instances, well known methods and structures have not been described in detail so as not to unnecessarily obscure the embodiments.

For purposes of example, a network may extend from a headend in a tree and branch structure to numerous subscribers having CPE devices. Different branches of the network define different sections of the network which may be referred to as downstream plants.

Examples of CPE devices may include conditional access enabled set-top boxes and media gateways. These CPE devices may be configured to receive broadcast control streams from a conditional access controller at the headend of the network that provides information to CPE devices generally with respect to the channels, programs, or management information such as firmware load. The broadcast control streams can also contain content directed toward a particular CPE device and information with respect to accessing other content (i.e., channel map information or the like). Control messaging may be used to restrict access to one CPE device in the plant to programs available at one subscription level and another CPE device in the plant to programs available at a different subscription level (i.e., more or less channels, different features, etc.).

Control stream content may also be subject to being localized depending on physical connectivity such that a stream or combination of streams specific to a particular plant location or geographic region of the network provides unique channel maps, Emergency Alert System messaging, and other specific localized information as required by the controller to account for different physical hardware which is logically segmented by location and/or account for other segmented plant specific requirements. Thus, a particular control stream may be intended for CPE devices in one segment or plant of the network, while an entirely different control stream may be intended for CPE devices in a different segment or plant of the network.

Methods utilized to provide CPE devices with control streams have relied upon the availability of only one appropriate control stream in any given logical segment or plant of the network. For instance, this may be accomplished with a unique Out-of-Band (OOB) signal per physical segment of the network. Out-of-Band typically refers to activity outside of a defined telecommunications frequency band, and out-of-band management typically involves the use of a dedicated channel for managing network devices. For instance, in a cable network, the out-of-band channel may be one outside of that used to transmit video signals or the like. For instance, it could be a frequency of 129 MHz or less in a cable network.

Figure 3:
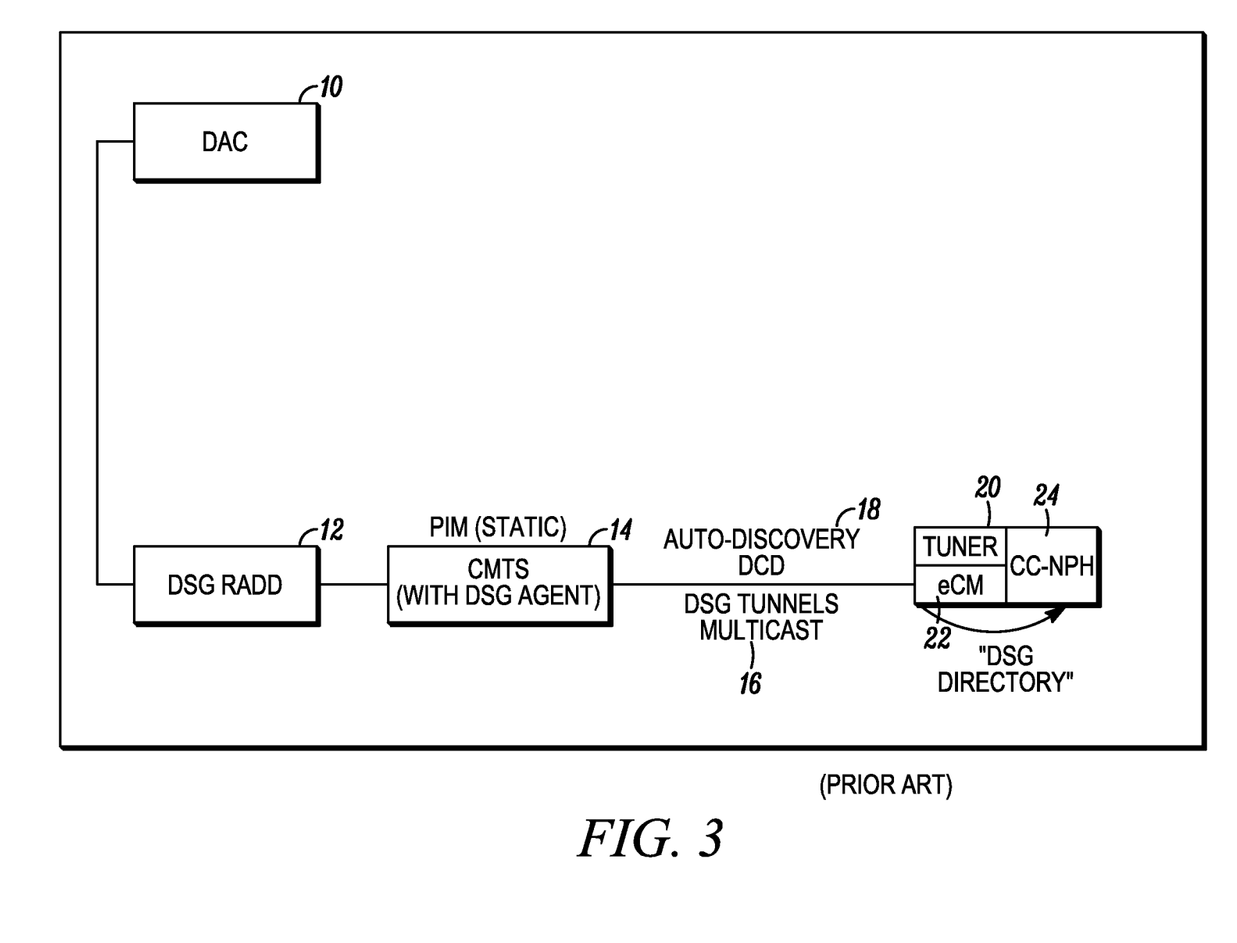
FIG. 3 depicts an illustrative example of a conventional DSG system, for comparison with an embodiment.

Another example of a system to provide control messages to CPE devices, particularly for a network operating under DOCSIS, is provided by DOCSIS Set-top Gateway (DSG) specifications in which the Cable Modem Termination System (CMTS) is programmed to apply a specific set of multicast control streams to a given logical downstream plant. FIG. 3 provides an example of such a DSG arrangement.

In FIG. 3, a controller (DAC) 10 provides control messages to a carousel server (DSG RADD) 12 which in turn transmits the control messages in the form of repetitive multicasts to a CMTS 14 at the headend of the network. The CMTS 14 includes a DSG agent which enables the control messages to be delivered to CPE devices over one-way DSG data tunnels 16. DSG requires the CMTS 14 to utilize Protocol Independent Multicast (PIM) with static join on DOCSIS side only. Each data tunnel 16 has a unique media access control (MAC) address. The CMTS 14 is required to generate and deliver an advanced DSG Downstream Channel Descriptor (DCD) message 18 that identifies the addresses of the data tunnels and enables the CPE device 20 to automatically discover which data tunnels should be utilized or joined by the particular CPE device. The CPE device 20 may be a media gateway having an embedded cable modem (eCM) 22 which provides the DCD message to a Cable Card 24. The Cable Card 24 uses a "DSG Directory" function within the Cable Card 24 to determine which data tunnels to join.

A problem with DSG is the desire of cable operators to avoid the CMTS configuration steps discussed above that are required to implement DSG. This can be problematic for various reasons, for instance, due to ever increasing numbers of DOCSIS downstream plants and the fact that the most common DSG implementations are only applicable to DOCSIS networks.

Accordingly, embodiments are disclosed herein that decouple the location detection function from the CMTS configuration and enables a CPE device to join the correct and appropriate multicast streams without receiving a DCD message generated by the CMTS. As discussed in greater detail, the embodiments may be based on the use of an independent out-of-band (OOB) marker which may be a separate signal which uniquely identifies the logical location of the CPE device on the network. The use of cable modem (CM) configuration files and information embedded within a broadcast control signal or the like may also be utilized during auto-discovery.

As an example of one embodiment, a unique OOB marker (i.e., plant ID) may be used to determine the logical location of a CPE device within the network and used to associate control messages applicable to the CPE device. This OOB signal could be used to directly specify multicast addresses to the CPE device or could be used with a separately provided lookup table (such as provided in a CM configuration file) to determine a correct set of multicast addresses required based on the logical location of the CPE device.

After a CPE device has received a correct set of multicast addresses required for its conditional access control stream, the CPE device can then subscribe to or join these streams from any multicast enabled network, for instance, traditional Ethernet or DOCSIS. Thus, the embodiments disclosed herein are not limited to use on DOCSIS networks and may be used on any Internet Protocol (IP) network such as a FTTH network.

An IP network can dynamically provide any multicast streams as required by its CPE clients without downstream specific configuration thereby alleviating any complex location specific configuration. The separately determined OOB plant ID is sufficient to determine the logical location of the CPE device as required by the conditional access controller. Any multicast enabled network can then provide the required multicast control streams via standard IP protocols, such as Internet Group Management Protocol (IGMP). Thus, according to embodiments disclosed herein, functions related to complex configuration are eliminated from the CMTS, and multicast control stream functionality can be used in DOCSIS as well as non-DOCSIS networks. Thus, use of DSG techniques (which is a DOCSIS specific implementation) is avoided.

Accordingly, cable network operators and other Multiple System Operators (MSOs) that choose not to deploy or allow DSG Advanced Mode, also known as Advanced DSG (ADSG), can benefit from aspects of the embodiments disclosed herein, which provide an alternative to DSG. ADSG uses static address assignment of a DSG Tunnel Address, which is sent to a DSG client device as part of a table in a Downstream Channel Descriptor (DCD) message produced by a CMTS as described above.

The following embodiments are directed to DOCSIS-based alternatives to DSG to support control messaging in cable networks. However, as stated above, the embodiments are not limited to DOCSIS cable networks. In addition, the embodiments do not require significant changes to the behavior of headend equipment and of M-Cards (Multi-Stream CableCards) of CPE devices which would otherwise be considered undesirable to network operators. Further, the embodiments disclosed herein are not limited to providing only control messaging and may be used to transmit other application traffic and payload. For instance, applications running on the CPE device may use the communication techniques described for the embodiments for purposes of obtaining video, audio, or other data that is multicast from local servers or networks within the headend or from the Internet.

According to one aspect of an embodiment, an architecture is provided enabling a network operator, if desired, to implement OOB or control messaging without the use of DSG. Further aspects of the architecture of an embodiment are able to allow an operator to retain flexibility to move toward system architecture that requires changes to M-Card and headend behavior, if and when elements across the system are able to support such changes.

An embodiment may use DOCSIS upstream/downstream to identify and transport control streams, such as conditional access control stream. The embodiments may also use IP multicast, instead of DSG tunnels, to carry control streams, without DCD mapping at a CMTS.

Architecture Overview

Figure 1:
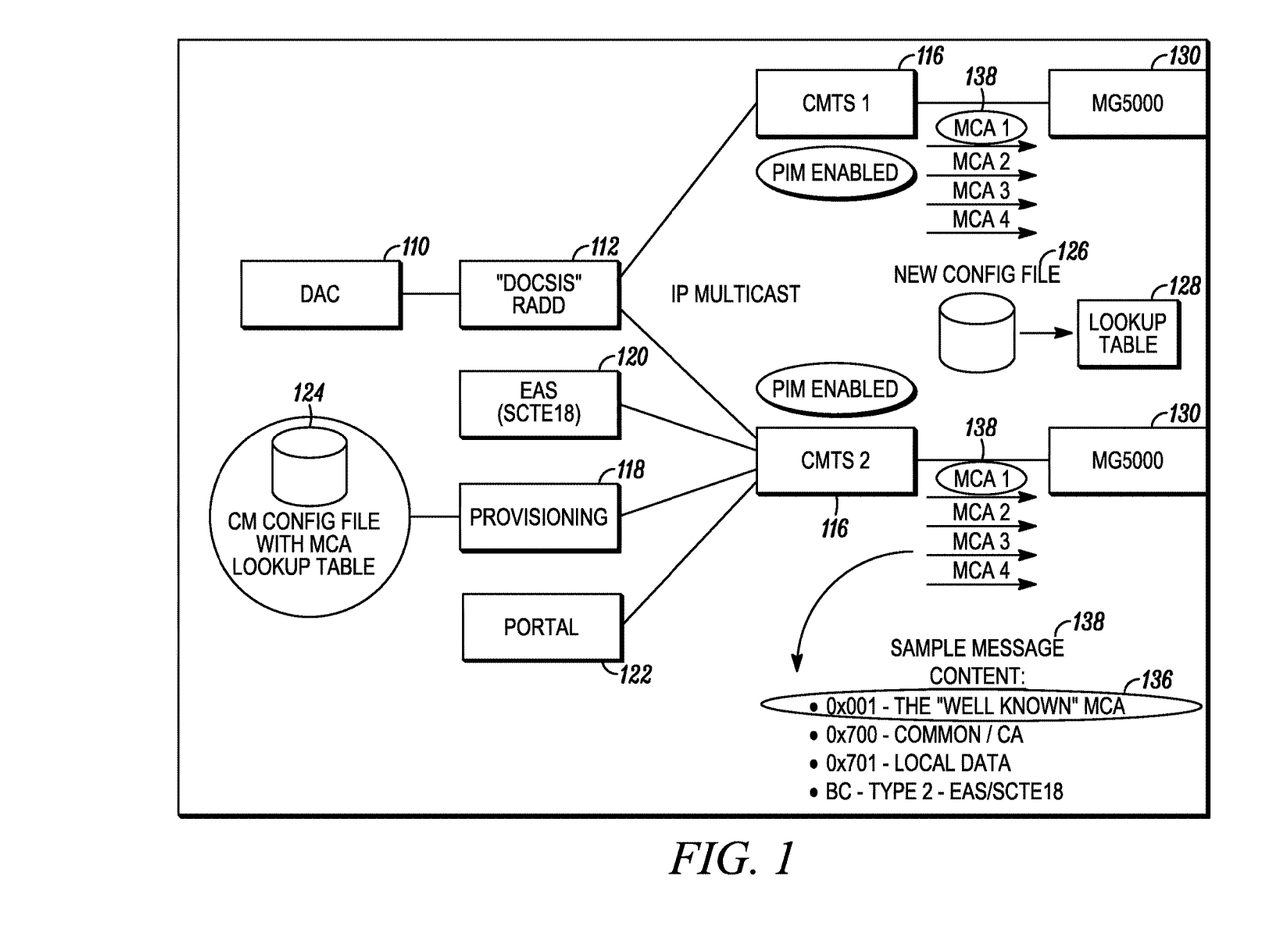
FIG. 1 depicts components of system architecture in accordance with an illustrative example of an embodiment.
Figure 2:
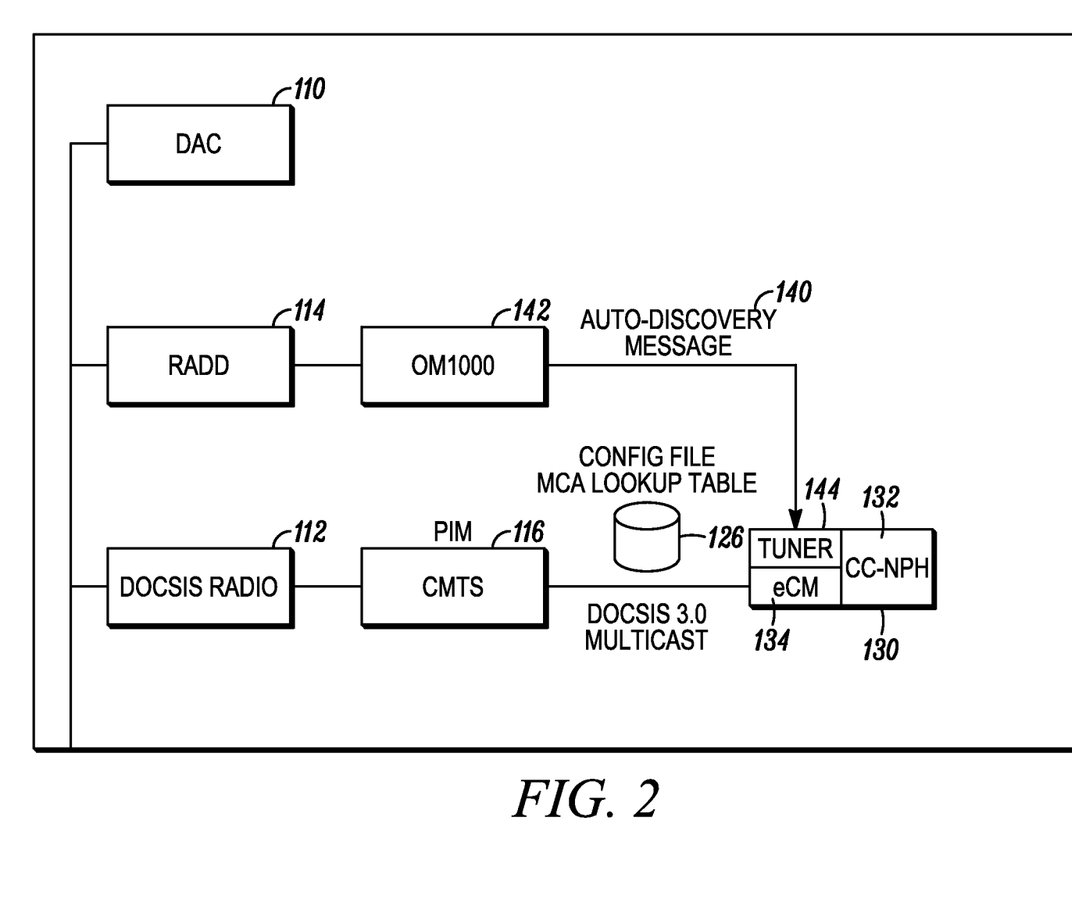
FIG. 2 depicts an illustrative example of a system in accordance with an embodiment.

FIGS. 1 and 2 depict illustrative examples of components of system architectures of embodiments.

At the headend of the network, a digital controller 110 (also referred to as a Digital Addressable Controller or DAC) may provide a billing interface and may provide a function of producing conditional access (CA) and other control streams. Typically, the controller 110 will contain or have access to information provided in the form of a database or the like including CPE control information, subscriber management information, security and access information, provisioning information, billing information, configuration information, and the like. Accordingly, the controller 110 is able to generate appropriate control messages for CPE devices, such messages may include, for instance, broadcast-type control messages intended for receipt by all CPE devices on the network and different local control messages intended for different sections or plants of the network.

As shown in FIGS. 1 and 2, the controller 110 provides the control messages to a download server 112 at the headend of the network. Here, the download server 112 may be a carousel server such as a remote addressable DANIS/DLS (RADD) server. If the network is a DOCSIS network, the server 112 may be referred to as a DOCSIS RADD as shown in FIGS. 1 and 2. In FIG. 2, another download server 114 is shown which communicates on an out-of-band channel with the CPE devices outside of DOCSIS constraints. This is discussed in greater detail below. The server 112 may repetitively transmit standard multicast streams containing the control messages that are sent directly to one or more CMTSs 116. Each stream may represent an individual data stream with one set of these streams required for each downstream plant of the network.

Accordingly, the CMTSs 116 receive the multicast from the server (DOCSIS RADD) 112 and simply pass the streams therethrough as standard multicast. Protocol Independent Multicast (PIM) is enabled on each CMTS 116. PIM is a multicast routing protocol for Internet Protocol (IP) networks that provides one-to-many and many-to-many distribution of data over a network. Thus, the CMTS 116 is not required to perform any additional function, for instance, as required by DSG.

As shown in FIG. 1, the CMTSs 116 may also receive information from a provisioning server 118, an Emergency Alert System (EAS) server 120, and a portal server 122 as well as other servers (not shown) such as an Electronic Program Guide (EPG) server.

The provisioning server 118 may have access to a data base 124 of cable modem (CM) configuration files that are transmitted to CPE devices during a CPE authentication process or upon boot or re-booting of a CPE device. The downloaded CM configuration files 126 may contain Multicast Address (MCA) information with respect to the multicast streams containing the control signals. The information may be in the form of a MCA lookup table 128 or the like enabling a CPE device to locate needed streams and control messages.

Accordingly, each CMTS 116 simply propagates multicast streams from the download server 112. As an example, the streams may include at least two Multicast Address (MCA) streams. These streams may include a broadcast stream intended for all CPE devices regardless of plant location and one or more localized streams which are intended for pre-determined downstream plants of the network. Alternatively, different plant streams may be implemented in the form of a single stream per downstream plant. Here, the broadcast traffic and plant specific traffic are combined such that only one stream is required per downstream plant. Other MCA streams may or may not be included such as EAS streams, switched digital video (SDV) streams, application traffic, other payload, and the like and are expected to vary from plant-to-plant and customer-to-customer. For example, EAS may not exist for some customers.

The above referenced streams are received by CPE devices, such as media gateway devices 130. Each gateway 130 may include a Cable Card (CC) or M-Card 132 which may manage conditional access and other services (such as interactive program guide services, impulse pay-per-view services, video-on-demand services, and other interactive services) for the gateway. The Cable Card 132 requires information provided by control messages from the controller 110. In an embodiment, the Cable Card 132 is set to operate in a "Native Mode" (NPH operating mode). The gateway 130 may use a Cable Card 132 in "Native Mode", as required, to auto-discover and connect the Cable Card 132 to the desired multicast control streams.

The gateway 130 may include an embedded cable modem (eCM) 134 which may be configured in DOCSIS-only ranging mode. The gateway 130 may also have an eRouter (not shown) which is an embedded Service/Application Functional Entity (eSAFE) device associated with the eCM 134 that permits multiple CPE devices at the customer premises to be connected to a high-speed data service. In an embodiment, the eRouter is responsible for Internet Group Management Protocol (IGMP) multicast joins for each MCA on the plant. The associated eCM 134 simply passes through the join request.

For purposes of enabling auto-discovery of relevant control messages intended for a particular gateway 130, a so-called "Well Known" MCA 136 may be included in the content of a control message, such as a broadcast message. See sample message 138 shown in FIG. 1. In this way, the required MCAs may be identified to the media gateway 130. In such an embodiment, information of the "Well Known" MCA 136 can permit the gateway 130 to default to a dummy control stream and then use its contents to continue an auto-discover process with the controller 112. Optionally, the MCA look up table may be provided in the CM configuration file or via an OOB message.

Downstream Plant Auto Discovery

A problem addressed by the embodiments disclosed herein relates to downstream plant auto discovery by the controller 110 which ultimately must be passed onto CPE devices. The embodiments do not impose a requirement on any headend equipment of obtaining information, such as tables from edge Quadrature Amplitude Modulation (QAM) modulators with respect to a Card Access Table (CAT) with corresponding downstream ID or the like. Rather, one of a portal method, a VCT_ID method, and an OOB_ID method may be utilized by the controller 110.

According to a portal method, a Channel Map assignment is determined from the Portal server 122 provided there is one-to-one mapping of a Portal Channel Map and downstream plant ID. An example of translation table entries may include the information, as follows:

| Portal Channel Map 1 | Downstream Plant ID 1 | Well Known EAS 1, Broadcast MCA, MCA1, |
|---|---|---|
| Portal Channel Map 2 | Downstream Plant ID 2 | Well Known MCA, EAS 2, Broadcast MCA, MCA2 |
| Portal Channel Map 3 | Downstream Plant ID 3 | Etc . . . |

As an alternative, a method for auto discovery of downstream plant of a network may be based on a Virtual Channel Table ID (VCT_ID) known or available to the controller 110 and enables a determination of downstream plant ID and associated MCAs provided that there is one-to-one mapping of VCT_ID and downstream plant ID. An example of translation table entries may include the information, as follows:

| VCT_ID 1 | Downstream Plant ID 1 | Well Known EAS 1, Broadcast MCA, MCA1, |
|---|---|---|
| VCT_ID 2 | Downstream Plant ID 2 | Well Known MCA, EAS 2, Broadcast MCA, MCA2 |
| VCT_ID 3 | Downstream Plant ID 3 | Etc . . . |

As a further alternative, a method for auto discovery of downstream plant of a network may be based on a process of tuning to an OOB data stream (which may be at a frequency, for instance, of 75.25 MHz) and obtaining the OOB_ID from traceroute (IP of the digital out-of-band modulator). An example of translation table entries is as follows:

| | | |
|---|---|---|
| OOB_ID 1 | Downstream Plant ID 1 | Well Known EAS 1, |
| | Downstream Plant ID 2 | Broadcast MCA, MCA1, |
| OOB_ID 2 | Downstream Plant ID 3 | Well Known MCA, EAS 2, |
| | | Broadcast MCA, MCA2 |
| OOB_ID 3 | Downstream Plant ID 4 | Etc . . . |
| | Downstream Plant ID 5 | |
| | Downstream Plant ID 6 | |

Accordingly, after the controller 110 assembles one or more of the above look-up tables, these may be made available to the CPE devices for use in automatically discovering the addresses of the multicast streams that should be consumed by a particular CPE device.

EXAMPLE

An example of an embodiment is shown in FIG. 2. Control messages are generated by the controller 110 and are ultimately provided to and received by the Cable Card 132 of the gateway 130. The control messages are provided to the server 112 which transmits multicast streams containing various control messages to the CMTS 116. The multicast streams pass through the CMTS 116 to the gateway 130 as described above. In addition, the server 114 transmits an auto-discovery message 140 to the gateway 130 via an out-of-band modulator 142 on an OOB dedicated channel. The gateway 130 may have an OOB tuner 144 that receives the auto-discovery message.

The cable card 132 of the gateway 130 may use the information obtained via the OOB channel to enable the gateway 130 to join the MCA streams to obtain the control messages that the controller 110 intended for the gateway 130. For this purpose, the gateway 130 may also utilize a MCA lookup table 126 received within a cable modem configuration file provided to the gateway 130. Alternatively, MCAs may be provided and embedded within another readily available stream, such as a broadcast or other identified well-known stream.

IGMP V2.0 vs. V3.0

With respect to embodiments specifically for the use on DOCSIS networks, DOCSIS changed its handling of multicast between DOCSIS version 2.0 and DOCSIS version 3.0. The control of the multicast protocol passed from the cable modem in DOCSIS 2.0 to the CMTS in DOCSIS 3.0. In DOCSIS 3.0, the CMTS intercepts all of the IGMP Join requests. The requests are then consolidated and the CMTS becomes a proxy for its subtending cable modems. The cable modems are notified by the CMTS of a multicast DSID that carries the multicast stream that they, or one of their clients, want to join.

Because the 3.0 CMTS is involved in every dynamic IGMP join and leave, there may be risks that the CMTS may be overrun with requests after plant interruption events. In an embodiment, a solution to this problem is provided by only permitting the CMTS to change the multicast DSID under limited circumstances; for example, after a full re-initialization. If the gateway has re-initialized itself due to a power interruption or other local issue, the gateway can store the DSID in non-volatile memory and begin listening for traffic on that DSID before trying to rejoin through the CMTS. The CMTS should eventually be notified that a given gateway is listening to a specific multicast, but if the DSID has not changed, the gateway may hold off a notification for a random back off time to avoid causing any overload problems.

Process

Figure 4:
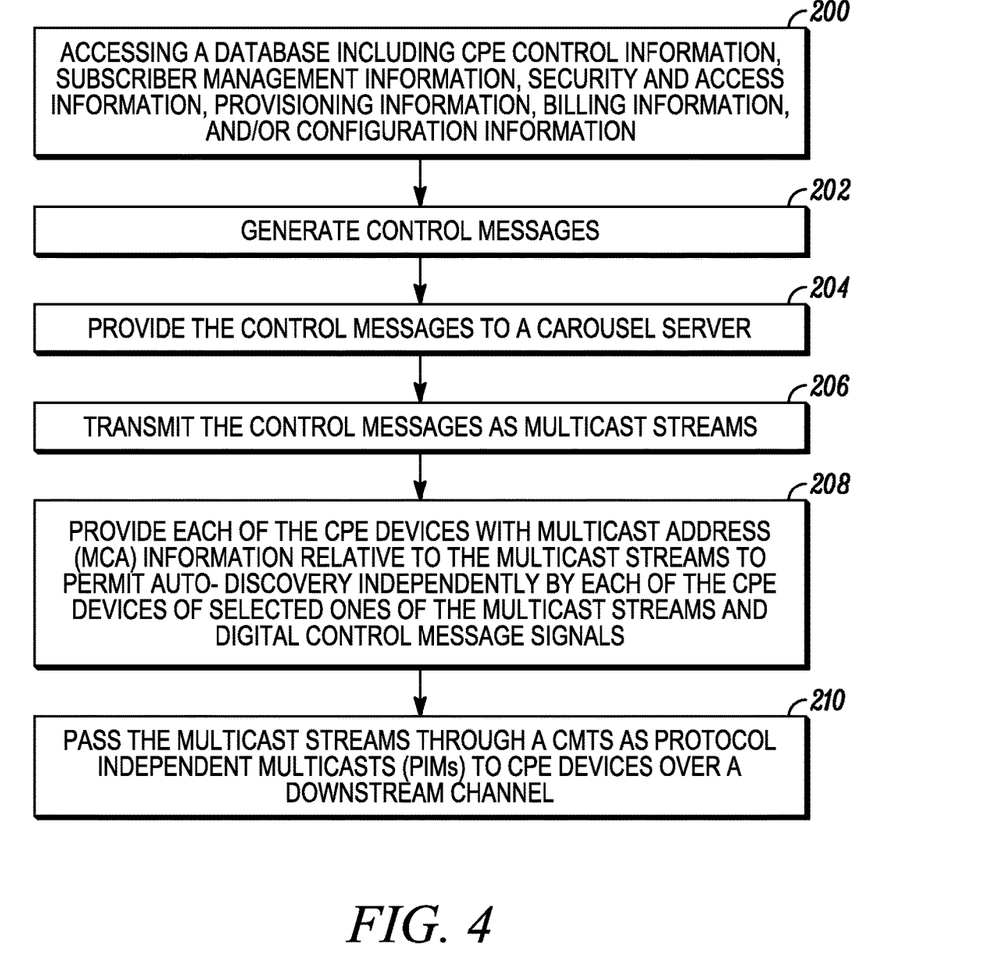
FIG. 4 is a flowchart of a method for providing control messaging to a plurality of CPE devices on a network in accordance to an embodiment.

The flowchart of FIG. 4 illustrates process steps for an embodiment providing control messaging to a plurality of customer premises equipment (CPE) devices communicatively coupled to a network. In step 200, a digital controller accesses a database or the like which includes any of CPE control information, subscriber management information, security and access information, provisioning information, billing information, and configuration information for purposes of generating a plurality of digital control message signals in step 202 for the plurality of CPE devices coupled to the network. The control messages are provided to a carousel or like server in step 204, and the carousel server then repetitively transmits the plurality of digital control message signals in step 206 as multicast streams to a CMTS.

In step 208, the CPE devices are provided with Multicast Address (MCA) information relative to the multicast streams to permit auto-discovery independently by each of the CPE devices of selected ones of the PIM streams and digital control message signals intended therefore. After the CPE devices receive the multicast address information, any of the CPE devices may than request the multicast streams from the CMTS. At this point the multicast streams traverse the CMTS and reach the CPE devices. Thus, as shown in FIG. 4, the multicast streams pass through the CMTS in step 210 as Protocol Independent Multicasts (PIMs) to the CPE devices over a downstream channel of the network. The CMTS does not pass the multicast streams until a CPE device first requests it.

Figure 5:
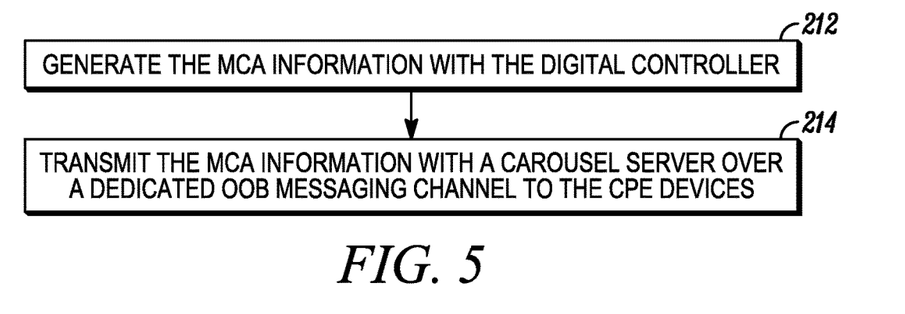
FIG. 5 is a flowchart of a method of enabling auto-discovery of control messaging for a CPE device in accordance to an embodiment.

As shown in FIG. 5, step 208 may be provided by generating the MCA information with the digital controller in step 212 and then transmitting the MCA information in step 214 to the plurality of CPE devices on a dedicated out-of-band (OOB) messaging channel. The portal method, VCT_ID method, or OOB_ID method discussed above for downstream plant discovery by the controller may be utilized in step 212 for purposes of forwarding the MCA information to the CPE devices.

Figure 6:
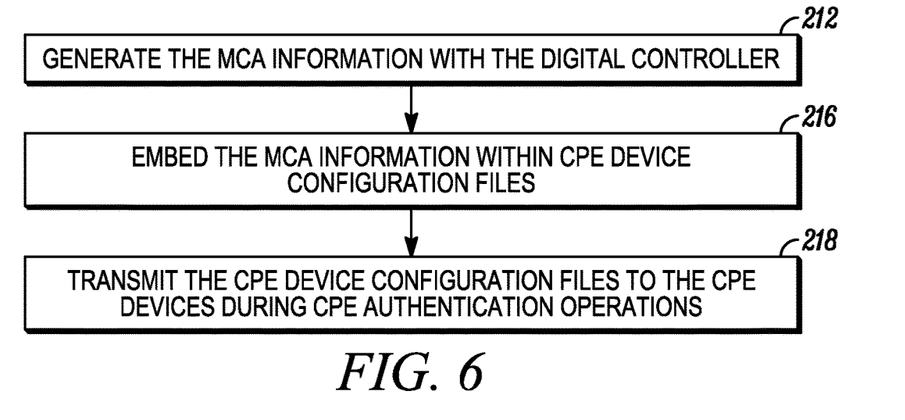
FIG. 6 is a flowchart of a first alternate method of enabling auto-discovery of control messaging for a CPE device in accordance to an embodiment.
Figure 7:
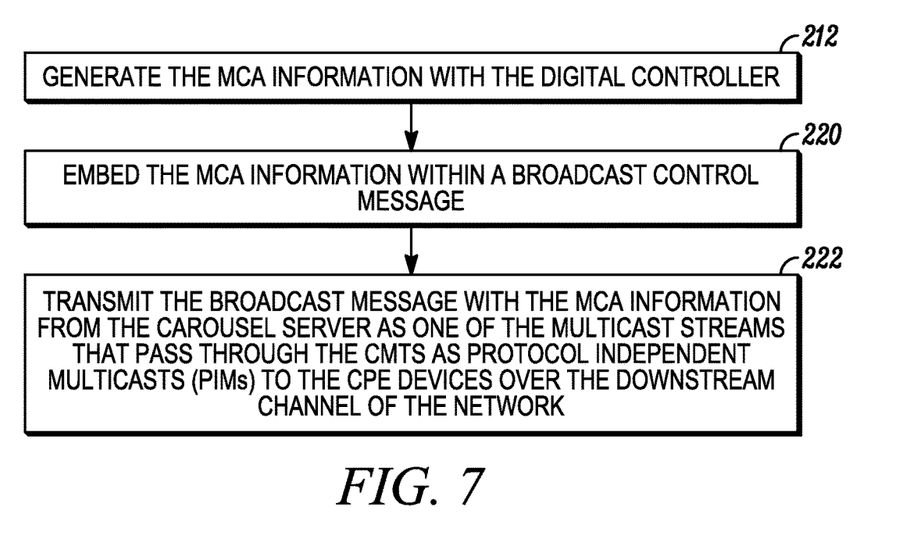
FIG. 7 is a flowchart of a second alternate method of enabling auto-discovery of control messaging for a CPE device in accordance to an embodiment.

Alternatively, as shown in FIG. 6, the MCA information may be generated and then embedded within CPE device configuration files, such as in the form of a MCA look-up table, in step 216. Thereafter, the CPE configuration files may be transmitted to the CPE devices in step 218 by a provisioning server during a CPE authentication process. As a further alternative shown in FIG. 7, the MCA information may be generated and then embedded within a multicast stream containing a broadcast control message in step 220. Thereafter, the broadcast message may be transmitted with the MCA information as part of one of the multicast streams that pass through the CMTS in step 222.

While the principles of the invention have been described above in connection with specific devices, apparatus, systems, and/or methods, it is to be clearly understood that this description is made only by way of example and not as limitation. One of ordinary skill in the art will appreciate that various modifications and changes can be made without departing from the scope of the claims below. Accordingly, the specification and figures are to be regarded in an illustrative rather than a restrictive sense, and all such modifications are intended to be included within the scope of the present invention.

The above referenced devices for carrying out the above methods can physically be provided on a circuit board or within another electronic device and can include various processors, microprocessors, controllers, chips, disk drives, and the like. It will be apparent to one of ordinary skill in the art that the modules, processors, controllers, units, servers, and the like may be implemented as electronic components, software, hardware or a combination of hardware and software. While some devices and processors may be described or depicted herein as separate entities, the functions may be combined into fewer or greater number of physical entities.

As described above, embodiments can be implemented in a DOCSIS network as well as non-DOCSIS networks including IP networks. In addition, although particular disclosed embodiments may involve the use of a CMTS, other embodiments may involve the use of other network devices and headend equipment through which multicasts are passed to CPE devices.

In addition, the multicast streams discussed above may include application traffic in addition to management and control-plane messaging. For example, applications running on the CPE may use the above referenced communication techniques to obtain video, audio, or other data that is multicast from local servers (or CDN) within the headend or from the internet. Thus, since the CPE knows its location within the network, it may obtain a custom-version of the MCAs, a different language, a local ad, programing more relevant to the subscriber, targeted marketing initiatives, and the like in the same manner it obtains the control messages as discussed above.

The word "comprise" or a derivative thereof, when used in a claim, is used in a nonexclusive sense that is not intended to exclude the presence of other elements or steps in a claimed structure or method. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

We claim:

1. A method for providing data streams to a plurality of customer premises equipment (CPE) devices communicatively coupled to a network, the method comprising the steps of:
   generating downstream network plant and CPE correlation information with a digital controller, the digital controller having access to a database including at least one of CPE control information, subscriber management information, security and access information, provisioning information, billing information, application traffic information, and configuration information;
   providing a plurality of data streams as Protocol Independent Multicasts (PIM) streams to the plurality of CPE devices; and
   providing auto-discovery enablement information to each of the CPE devices, the auto-discovery enablement information comprising Multicast Address information relative to the plurality of PIM streams to permit auto-discovery by each of the CPE devices of appropriate PIM streams;
   wherein providing the auto-discovery enablement information to each of the CPE devices includes at least one of:
      transmitting the Multicast Address information to the plurality of CPE devices on one or more dedicated out-of-band, OOB, messaging channels,
      transmitting the Multicast Address information to one or more CPE devices in CPE device configuration files during CPE device authentication processes, and
      transmitting the Multicast Address information within a multicast stream to which at least one of the CPE devices on the network is configured to join; and
   wherein the auto-discovery enablement information enables each of the CPE devices to join an auto-discovered appropriate PIM stream without receiving a DOCSIS Set-top Gateway Downstream Channel Descriptor over the network.

2. The method according to claim 1, wherein the data streams include at least one of CPE management messaging, CPE control messaging, conditional access messaging, service information messaging, Electronic Program Guide messaging, Emergency Alert System messaging, application traffic, video, audio, data streams in a pre-determined language, local advertisements, content selected as being relevant to a particular subscriber, and targeted marketing.

3. The method according to claim 1, further comprising the step of:
   generating with the digital controller a plurality of digital control message signals for the plurality of CPE devices coupled to the network; and
   wherein said providing a plurality of data streams step includes transmitting at least one of the digital control message signals as Protocol Independent Multicast (PIM) streams to the plurality of CPE devices over a downstream channel of the network after reception of a join request from at least one CPE device.

4. The method according to claim 1, wherein said generating step includes correlating the downstream network plant with CPE locations by mapping of at least one Portal Channel Map to at least one downstream plant ID and associating one or more Multicast Addresses therewith.

5. The method according to claim 1, wherein said generating step includes correlating downstream network plant with CPE locations by mapping of at least one Virtual Channel Table ID (VCT_ID) to at least one downstream plant ID and associating one or more Multicast Addresses therewith.

6. The method according to claim 1, wherein said generating step includes correlating the downstream network plant with CPE locations by obtaining at least one Out-Of-Band ID (OOB_ID) from a digital out-of-band (OOB) modulator and mapping of said OOB_ID to at least one downstream plant ID and associating one or more Multicast Addresses therewith.

7. The method according to claim 1, wherein said providing each of the CPE devices with Multicast Address information step includes transmitting the Multicast Address information to the plurality of CPE devices on one or more dedicated out-of-band (OOB) messaging channels.

8. The method according to claim 1, wherein said providing each of the CPE devices with Multicast Address information step includes transmitting the Multicast Address information to one or more CPE devices in CPE device configuration files during CPE device authentication processes.

9. The method according to claim 1, wherein the Multicast Address information includes a Multicast Address look-up table including at least a downstream plant ID and associating one or more Multicast Addresses therewith.

10. The method according to claim 1, wherein said providing each of the CPE devices with Multicast Address information step includes transmitting the Multicast Address information within a multicast stream to which at least one of the CPE devices on the network is configured to join.

11. The method according to claim 1, wherein the digital controller communicates the plurality of data streams to a carousel server which repetitively transmits the multicast streams through network equipment located in a communication path between the carousel server and the plurality of CPE devices.

12. The method according to claim 1, wherein the multicast streams include a broadcast stream intended for receipt by all of the CPE devices on the network and a local area stream providing a channel map applicable to only a subset of the CPE devices on the network.

13. An apparatus for providing data streams to a plurality of customer premises equipment (CPE) devices communicatively coupled to a network, comprising:
one or more servers for transmitting a plurality of data streams as multicast streams that pass through the network as Protocol Independent Multicast (PIM) streams to the plurality of CPE devices over the network; and
a digital controller having access to a database including at least one of CPE control information, subscriber management information, security and access information, provisioning information, billing information, application information, and configuration information, said digital controller being configured to generate downstream network plant and CPE correlation information and provide auto-discovery enablement information to each of the CPE devices, the auto-discovery enablement information comprising Multicast Address information relative to the plurality of PIM streams to permit auto-discovery by each of the CPE devices of appropriate PIM streams;
wherein the one or more servers are configured for at least one of:
transmitting the Multicast Address information to the plurality of CPE devices on one or more dedicated out-of-band, OOB, messaging channels,
transmitting the Multicast Address information to one or more CPE devices in CPE device configuration files during CPE device authentication processes, and
transmitting the Multicast Address information within a multicast stream to which at least one of the CPE devices on the network is configured to join; and
wherein the auto-discovery enablement information enables each of the CPE devices to join an auto-discovered appropriate PIM stream without receiving a DOCSIS Set-top Gateway Downstream Channel Descriptor over the network.

14. The apparatus according to claim 13, wherein the digital controller is configured to correlate downstream network plant with CPE locations and map at least one of a Portal Channel Map, Virtual Channel Table ID (VCT_ID), and Out-Of-Band ID (OOB_ID) to at least one downstream plant ID and associate one or more Multicast Addresses therewith.

15. The apparatus according to claim 13, further comprising a server configured to provide each of the CPE devices with Multicast Address information generated by the digital controller relative to the PIM streams to permit auto-discovery by each of the CPE devices of PIM streams intended therefor.

16. The apparatus according to claim 15, wherein said server is configured to receive the Multicast Address information from the digital controller and transmit the Multicast Address information to at least one of the CPE devices on at least one dedicated out-of-band (OOB) messaging channel.

17. The apparatus according to claim 15, wherein said server is configured to transmit the Multicast Address information within at least one CPE device configuration file provided to at least one of the CPE devices during a CPE authentication operation.

18. The apparatus according to claim 13, wherein the download server is configured to transmit Multicast Address information within a multicast stream to which at least one of the CPE devices on the network is configured to join, the Multicast Address information corresponding to the PIM streams to permit auto-discovery by each of the CPE devices of PIM streams intended therefor.

19. The apparatus according to claim 13, wherein the digital controller is configured to generate digital CPE control message signals for the plurality of CPE devices coupled to the network, and wherein the download server is a carousel server which is configured to repetitively transmit the multicast streams as Protocol Independent Multicasts (PIMs) through a Cable Modem Termination System (CMTS) of the network to the plurality of CPE devices over a download channel.

* * * * *

UNITED STATES PATENT AND TRADEMARK OFFICE
CERTIFICATE OF CORRECTION

| | | |
|---|---|---|
| PATENT NO. | : 10,148,448 B2 | Page 1 of 1 |
| APPLICATION NO. | : 14/548540 | |
| DATED | : December 4, 2018 | |
| INVENTOR(S) | : Cliff D. Aaby et al. | |

It is certified that error appears in the above-identified patent and that said Letters Patent is hereby corrected as shown below:

On the Title Page

Item (60), under Related U.S. Application Data: Change "61/907,426" to --61/907,462--

Signed and Sealed this
Twelfth Day of November, 2024

Katherine Kelly Vidal
Director of the United States Patent and Trademark Office